United States Patent [19]

Nakamura et al.

[11] Patent Number: 4,651,162

[45] Date of Patent: Mar. 17, 1987

[54] THERMAL PRINTER ERASURE METHOD

[75] Inventors: Tadashi Nakamura, Morioka; Ikuo Hibino, Takizawa, both of Japan

[73] Assignee: Alps Electric Co., Ltd., Japan

[21] Appl. No.: 849,747

[22] Filed: Apr. 9, 1986

[30] Foreign Application Priority Data

| | | | |
|---|---|---|---|
| Apr. 9, 1985 | [JP] | Japan | 60-73440 |
| Apr. 17, 1985 | [JP] | Japan | 60-80283 |
| Apr. 17, 1985 | [JP] | Japan | 60-80285 |

[51] Int. Cl.[4] .......... G01D 15/10; B41J 3/10

[52] U.S. Cl. .......... 346/1.1; 346/76 PH; 400/120; 400/696

[58] Field of Search .......... 346/76 PH, 1.1; 400/120, 696

[56] References Cited

U.S. PATENT DOCUMENTS

| | | | |
|---|---|---|---|
| 3,855,448 | 12/1974 | Hawagata et al. | 219/216 |
| 4,531,135 | 7/1985 | Toshima | 346/76 PH |
| 4,545,693 | 10/1985 | Bartlett et al. | 400/120 |
| 4,563,692 | 1/1986 | Negita et al. | 346/76 PH |

*Primary Examiner*—E. A. Goldberg

*Assistant Examiner*—Gerald E. Preston

*Attorney, Agent, or Firm*—Guy W. Shoup

[57] ABSTRACT

A printing method for a thermal printer having a heat-sensitive recording medium containing a coloring material interposed between a recording paper laid on a platen and a thermal head. For printing, the coloring material is transferred from the recording medium to the paper by the print energy of the thermal head. A low print energy level and a high print energy level are respectively set in advance and during the printing operation energy of the former level is applied to the recording medium while during the correcting operation energy of the former level is applied to the recording medium to bond the printed characters on the recording paper to the recording medium. In preparation for the correcting operation, the thermal head is preheated in its head-up state at which stage it is separated from the platen. Printing and correcting operations are executed on the basis of information on the head surface temperature detected by a temperature sensor.

3 Claims, 14 Drawing Figures

THERMAL PRINTER ERASURE METHOD

BACKGROUND OF THE INVENTION

1. Field of the Invention

This invention relates to a printing method for a thermal printer suitable for use with a word processor, a typewriter or the like.

2. Description of the Prior Art

A thermal printer, such as that disclosed in the specification of Japanese Patent Publication No. 26245/1974, is arranged in such a manner that a heat-sensitive recording medium containing a reversible heat melting ink, i.e., an ink ribbon, is interposed between a recording paper and a thermal head, and the heat of the thermal head melts the ink contained by the ink ribbon so as to record a character, a symbol or the like on the recording paper.

These kinds of thermal printers have recently been widely used as output devices for office machinery and, as an example, they have been adapted for incorporation into word processors, electronic typewriters and the like. Such word processors or typwriters normally require a function for correcting characters, symbols and so forth recorded on paper, that is, a correcting operation. However, common conventional thermal printers have been so arranged that characters, symbols, etc. already recorded directly on the paper needed to be corrected. Thus they involve the disadvantage in that it is difficult to erase printed matter and if any error in printing is found, the printed section in error has to be manually corrected or alternatively reprinting must be effected.

SUMMARY OF THE INVENTION

1. Object of the Invention

This invention has been devised in view of the above-mentioned actual situation of the prior arts and an object of this invention is to provide a printing method for a thermal printer which enables a correcting operation with excellent results to be performed as well as its printing function.

2. Brief Summary of the Invention

To this end, this invention is arranged in such a manner that low print energy of about 25 to 35 mj/mm$^2$ and high print energy of about 45 to 55 mj/mm$^2$ are set in advance and while printing is being undertaken, the former low print energy is applied to the heat-sensitive recording medium so as to effect a given recording on the recording paper while during the performance of a correcting operation wherein printing already recorded on the recording paper is corrected, the latter high print energy is applied to the heat-sensitive recording medium so as to bond the printing recorded on the recording paper to the heat-sensitive recording medium. Additionally, this invention is so designed as to selectively effect a printing operation or a correcting operation when the surface temperature of the thermal head has reached a predetermined temperature.

DESCRIPTION OF THE PREFERRED EMBODIMENT

The printing method of this invention will be described below with reference to the accompanying drawings.

Figure 1:
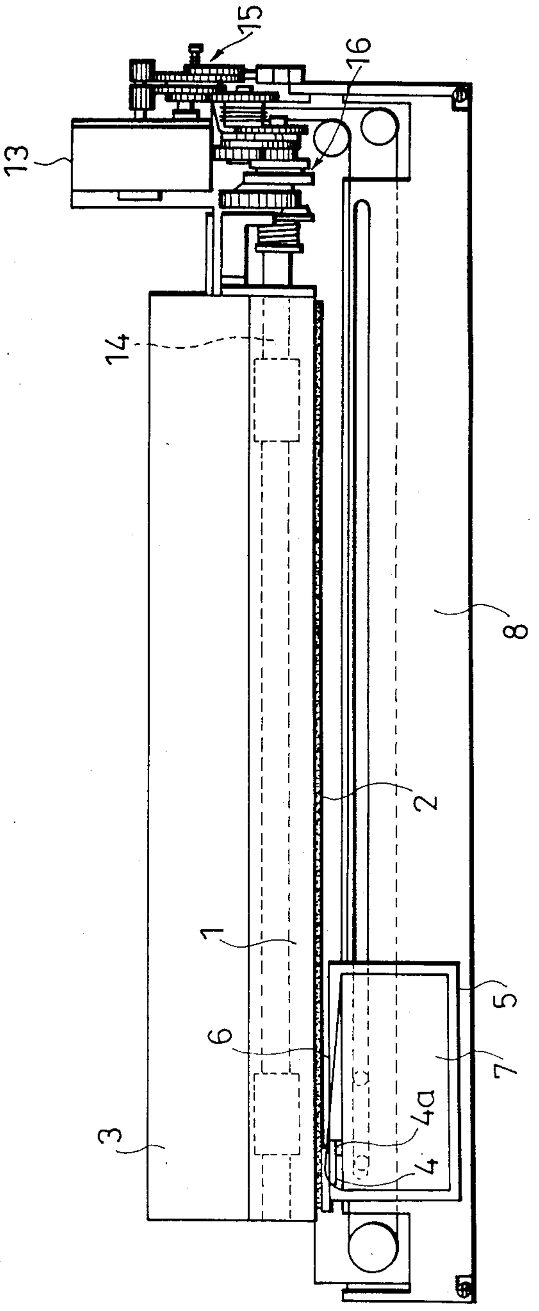
FIG. 1 is a plan view showing the whole construction of an example of a thermal printer embodying the printing method in accordance with this invention.
Figure 2A:
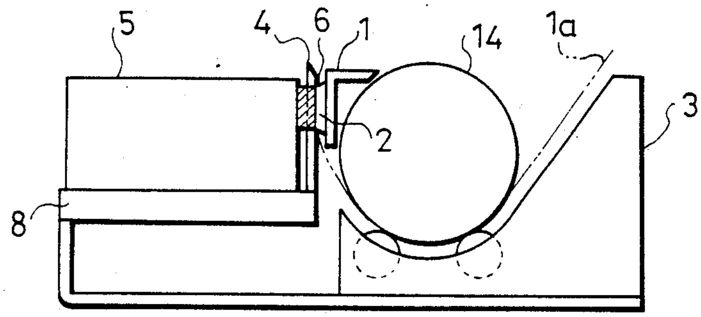
FIGS. 2(*a*) and 2(*b*) are side views showing the operation of the thermal printer shown in FIG. 1, respectively.
Figure 2B:
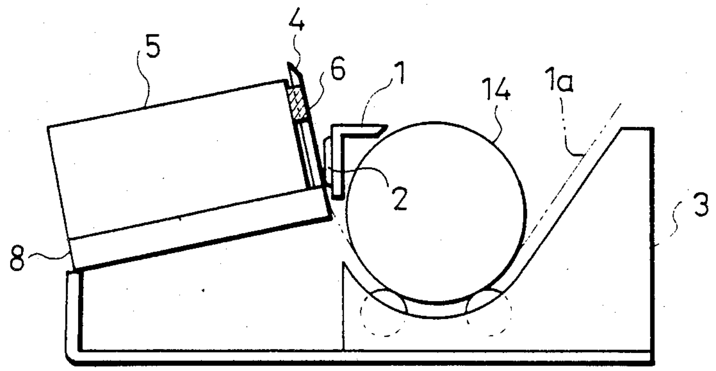

FIG. 1 is a plan view showing the whole construction of an example of the thermal printer embodying the printing method of this invention, and FIGS. 2(*a*) and 2(*b*) are side views showing the operation of the thermal printer shown in FIG. 1, respectively. In FIGS. 1, 2(*a*) and 2(*b*), reference numeral 1 denotes a platen, reference 2 a platen rubber for setting a print position, and reference numeral 1*a* a recording paper which is laid over the platen 1 and platen rubber 2. Reference numeral 3 denotes a paper guide for guiding the recording paper 1*a* along the platen rubber 2 of the platen 1, reference numeral 4 a thermal head having a plurality of heating elements which is adapted to be set in face-to-face relationship with the platen rubber 2, reference numeral 4*a* a temperature sensor which detects the temperature of the thermal head, and reference numeral 5 a carriage which is loaded with the thermal head 4 and is capable of moving in the rightward and leftward directions along the platen 1 as shown in FIG. 1. Reference numeral 6 denotes a heat-sensitive recording medium described below which contains a coloring material, or a printing ribbon, which medium is interposed between the thermal head 4 and the recording paper 1*a*. Reference numeral 7 denotes a ribbon cassette which accommodates the printing ribbon 6 and is fitted into the above-mentioned carriage 5, and reference numeral 8 a carriage supporting member which supports the carriage 5 so that the carriage may move in the right and left directions.

In the same FIG. 1, reference numeral 13 denotes a drive source or a pulse motor, reference numeral 15 a gear group which transmits the torque of the pulse motor 13, and reference numeral 16 a clutch mechanism which selectively transmits the torque which is received from the pulse motor 13 through the gear group 15 to either a moving mechanismm for the carriage 5 or a rotating mechanism for a paper feeding shaft 14 which feeds the recording paper 1*a*.

In the next place, the general construction of the printing ribbon 6 mentioned above will be explained using the enlarged side view of an essential portion shown in FIG. 3.

Figure 3:
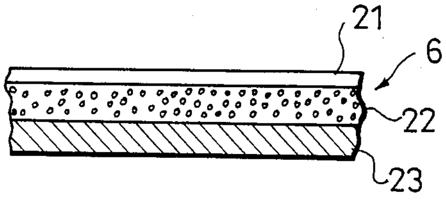
FIG. 3 is an enlarged side view of an essential portion showing the general construction of a heat-sensitive recording medium which is set into the thermal printer shown in FIG. 1.

In this FIG. 3, reference numeral 21 denotes an overcoat layer having a melting point of, for example, 100° C. or less, and a low viscosity, this layer being so formed as to be capable of being set into face-to-face relationship with the recording paper 1*a*, and consisting of a substantially transparent wax having a thickness of, for example, 1 to 2 microns. Reference numeral 22 denotes an ink layer having a thickness of, for example, 3 to 8 microns and which includes a binder and a coloring material such as carbon black, both of which have strong adherence and a higher melting point and viscosity than those of the overcoat layer 21. The proportion of the binder relative to the coloring material in this ink layer 22 is set at a certain level wherein, for example, a higher percentage of the coloring material is contained. Reference numeral 23 denotes a base layer consisting of a plastic having a thickness of, for example, 3 to 12 microns, which is formed in continuous relationship with the ink layer 22 and is subjected to print energy. Additionally, the setting is such that in a case where the print energy ranges, for example, from about 20 to 35 mj/mm$^2$, the affinity or adhesive force between the above-mentioned ink layer 22 and the base layer 23 is weakened, that is, the ink layer 22 is easily stripped off the base layer 23, while in the case where the print energy ranges from about 45 to 55 mj/mm$^2$, the affinity therebetween is strengthened, that is, the ink layer 22 is more firmly bonded to the base layer 23. In addition, the above-mentioned affinity between the ink layer 22 and the recording paper 1*a* is set in such a manner that it is strengthened in the case where the print energy ranges, for example from about 20 to 35 mj/mm$^2$, and is weakened in the case of ranging from about 45 to 55 mj/mm$^2$.

Figure 5:
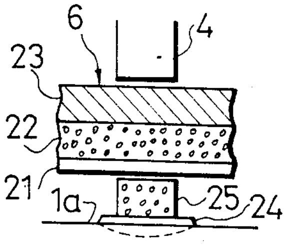
FIGS. 5(*a*), 5(*b*) and 5(*c*) are diagrams illustrating the correcting operation effected in the thermal printer shown in FIG. 1.
Figure 5:
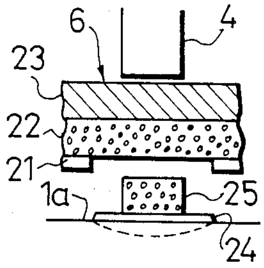
Figure 5:
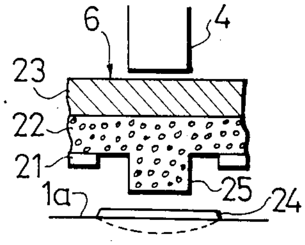
Figure 6:
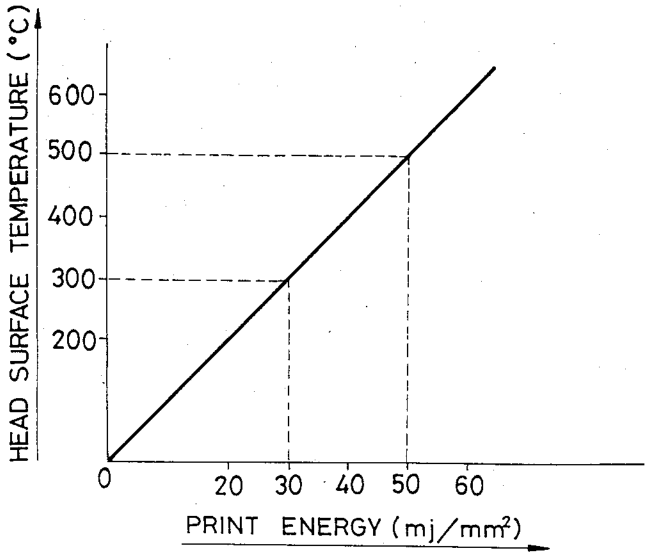
FIG. 6 is a diagram showing the relationship between the head surface temperature and the print energy which is applied to the thermal head of the thermal printer shown in FIG. 1.
Figure 7:
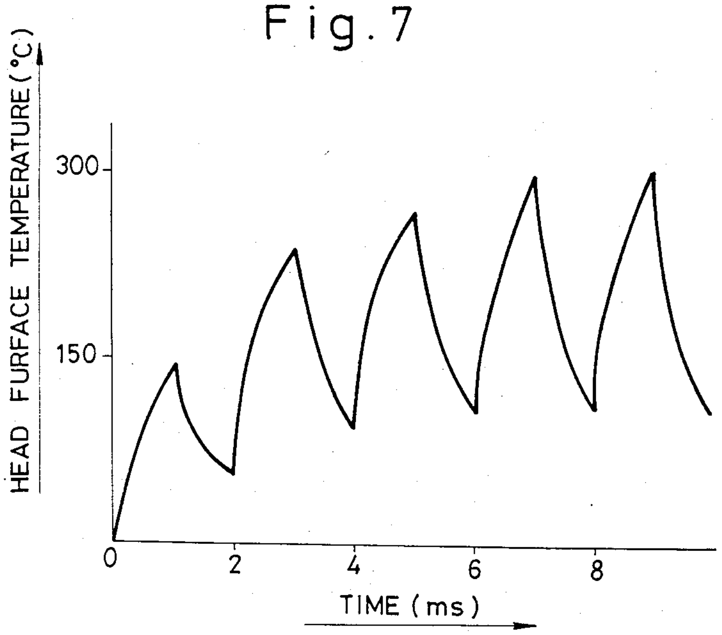
FIG. 7 is a diagram showing an example of variations in the surface temperature of the thermal head during the printing operation in accordance with the printing method of this invention.
Figure 8:
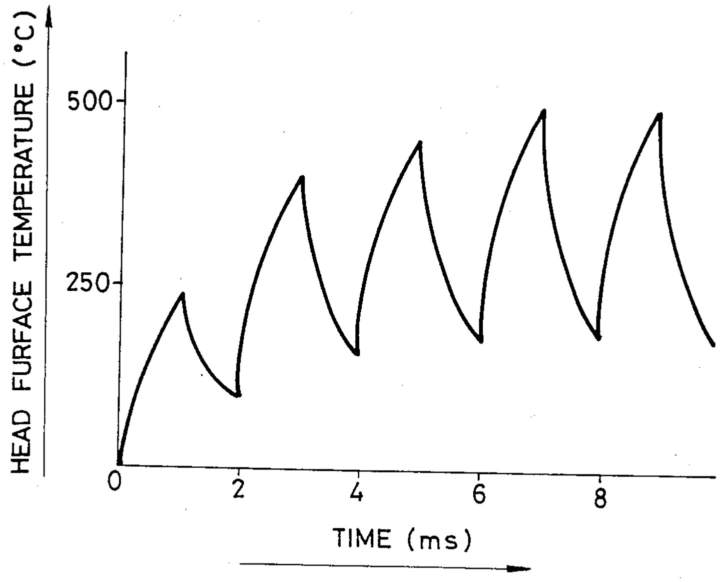
FIG. 8 is a diagram showing an example of variations in the surface temperature of the thermal head during the correcting operation in accordance with the printing method of this invention.
Figure 9:
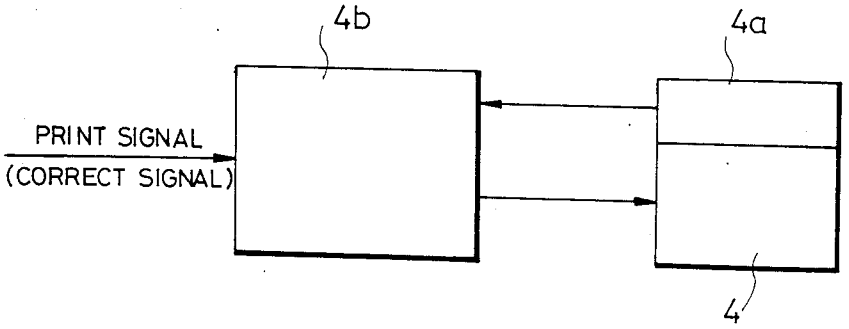
FIG. 9 is a block diagram explaining the relationship between a temperature sensor and a control section in giving print commands and correction commands.

Description will be made hereinbelow of one preferred embodiment of the printing method for the above-mentioned thermal printer with reference to FIGS. 4(*a*), 4(*b*), 4(*c*), 5(*a*), 5(*b*), 5(*c*), 6, 7, 8, and 9. In these figures, FIGS. 4(*a*), 4(*b*) and 4(*c*) are diagrams illustrating the print operation which is effected by using the thermal printer shown in FIG. 1. FIGS. 5(*a*), 5(*b*) and 5(*c*) are diagrams illustrating the correcting operation which is effected by using the same thermal printer. FIG. 6 is a diagram showing the relationship between the head surface temperature and the print energy which is applied to the thermal head. FIG. 7 is a diagram showing an example of variations in the surface temperature of the thermal head during the printing operation. FIG. 8 is a diagram showing an example of variations in the surface temperature of the thermal head during the correcting operation, and FIG. 9 is a block diagram showing the flow path of a signal during the printing or correcting condition.

In operation, the pulse motor 13 shown in FIG. 1 is driven so as to drive the gear group 15 and the clutch mechanism 16, and thereby the paper feeding shaft 14 is rotated so that the recording paper 1*a* is set in a printing position. At this time, as shown in FIG. 2(*a*), a rotating mechanism (not shown) for the carriage 5 is actuated to rotate the carriage 5 anticlockwise, as shown, so that the thermal head 4 is maintained in a state of being separated from the platen rubber 2, that is, in the head-up state.

When the pulse motor 13 is driven in this state, the above-mentioned rotating mechanism (not shown) for the carriage 5 is actuated to rotate the carriage 5 clockwise as shown in FIG. 2(*a*), so that the thermal head 4 is applied on the platen rubber 2 with the printing ribbon 6 being clamped therebetween and assumes a state wherein it becomes possible to execute printing on the recording paper 1*a*, i.e., a printing operation, or to execute the erasure of printing already recorded on the recording paper 1*a*, i.e., a correcting operation, which is called a head-down state.

For the execution of the printing and correcting operations, the clutch mechanism 16 is changed over so that the torque of the pulse motor 13 is transmitted to the moving mechanism for the carriage 5 via the gear group 15 and the clutch mechanism 16, and thereby the carriage is moved along the platen 1 or the platen rubber 2.

In the above described head-up state shown in FIG. 2(*b*), the following operation is performed in preparation for a printing or correcting operation to be subsequently executed. The thermal head 4 is heated by applying thereto a pulse signal for a period of, for example, more or less 7 ms, as shown in FIG. 7 or 8. More specifically, if the subsequently executed operation is a printing operation, the thermal head 4 is heated such that the head surface temperature is set at a given temperature, such as about 280° C. as in FIG. 7. If the subsequently executed operation is a correcting operation, the thermal head 4 is heated such that the head surface temperature is set at a given temperature, such as about 480° C. as in FIG. 8.

Figure 4:
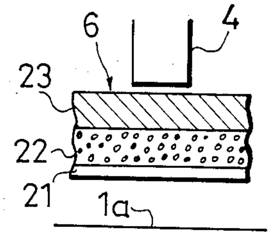
FIGS. 4(*a*), 4(*b*) and 4(*c*) are diagrams illustrating the print operation effected in the thermal printer shown in FIG. 1, respectively.
Figure 4:
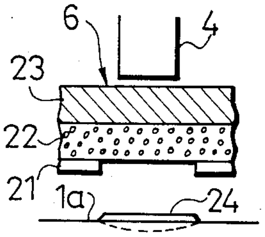
Figure 4:
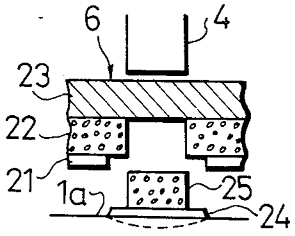

If the print operation is to be executed in this head-up state, the above-mentioned moving mechanism (not shown) for the carriage 5 is actuated to bring the thermal head 4 into the head-down state as shown in FIG. 4(*a*) wherein the overcoat layer 21 of the printing ribbon 6 is positioned in opposition to the recording paper 1*a* as shown in FIG. 4(*a*). When the thermal head 4 is heated in the head-up state as described above until the surface temperature becomes, for example, 280° C., about 30 mj/mm$^2$ of print energy is finally made available for application to this thermal head 4. Consequently, as shown in FIG. 4(*b*), a part of the overcoat layer 21 having a low melting point starts to meltingly penetrate into the recording paper 1*a*, thereby forming a wax portion 24 on the recording paper 1*a*.

In the next place, the ink layer 22 melts, as shown in FIG. 4(*c*), and when the print energy ranges from 20 to 35 mj/mm$^2$, the ink layer 22 is, as described above, easily stripped off the base layer 23 while the ink layer 22 becomes strongly bonded to the recording paper 1*a*. By this action, a symbol such as a character 25 containing a coloring material and a binder is printed on the wax portion 24 formed on the recording paper 1*a*.

For the execution of the correcting operation by which the printed character 25 recorded on the recording paper 1*a* is corrected, the thermal head 4 assumes the head-down state shown in FIG. 2(*a*), similarly to the condition during printing wherein the overcoat layer 21 of the printing ribbon 6 is positioned in opposition to the character 25 on the recording paper 1*a*. Additionally, when the thermal head 4 is, as described above, heated in the head-up state until the surface temperature becomes, for example, 480° C., about 50 mj/mm$^2$ of print energy is finally made available for application to the thermal head 4, whereby, as shown in FIG. 5(*b*), the overcoat layer 21 opposing the character 25 starts to melt. As described above, when the print energy ranges from 45 to 55 mj/mm$^2$, the base layer 23 is strongly bonded to the ink layer 22 while the adherence of the ink layer 22 to the recording paper 1*a* is weakened. Consequently, the character 25 is bonded to the ink layer 22 from the wax portion 24 of the recording paper 1*a* as shown in FIG. 4(*c*).

In the printing method performed in the above manner, a problem arises in connection with the relationship between the temperature sensor 4*a* which detects a predetermined temperature for the print and correct operations and a control section 4*b* which gives a print command, a correction command, a non-print command or a non-correction command in correspondence with the information obtained from this detected temperature. The block diagram of this relationship is shown in FIG. 9. As can be seen from this figure, when a print signal is supplied to the control section 4*b*, the temperature sensor 4*a* detects the surface temperature of the thermal head 4. At this time if a predetermined temperature has been reached, the control section 4*b* gives a print command to the thermal head 4 so as to execute printing. On the other hand, if a predetermined temperature has not yet been reached, the control section 4*b* does not give a print command even when a print signal is inputted. In the meantime, the thermal head 4 remains heated, and at the point of time when the temperature sensor 4*a* detects a predetermined temperature—here, a temperature as high as about 280° C.—a printing operation starts.

The manner of the correcting operation, which is similar to the above described printing operation, is such that even when a correcting signal is supplied to the control section 4*b*, the correcting operation is not executed unless the head surface temperature has reached a predetermined temperature such as about 480° C. In the case of executing the correcting operation, a correction command is given by the control section in correspondence with the information based on the predetermined temperature detected by the temperature sensor 4*a*.

The printing method performed in the above described manner has an advantage in that the printing and correcting operations can be realized together by using the print ribbon 6 alone, thereby enabling simplification and miniaturization of the whole structure of the thermal printer embodying the printing method of this invention.

Furthermore, in accordance with the aforesaid printing method, high quality printing can be realized upon execution of the printing operation since the printing is effected by virtue of the strong affinity between the ink layer 22 and the recording paper 1*a*.

In accordance with the aforesaid printing method, the execution of the correcting operation is such that the character 35 is bonded to the ink layer 22 from the wax portion 24 formed on the recording paper 1*a*, so that the recording paper 1*a* is protected from becoming fluffy so as to be able to keep smooth the surface condition of the corrected recording paper 1*a*. In addition, in the case where reprinting is to be effected on the wax portion 24 from which the character 25 has been removed, the character 25 is printed on the wax portion 24 formed on the recording paper 1*a*, whereby high quality reprinting can be achieved.

Additionally, in accordance with the above described preferred embodiment, the arrangement is such that the thermal head 4 remains heated in the head-up state in such a manner that it is able to quickly respond to the print or correction commands. Also, the temperature sensor 4*a* is arranged such that it supervises the head surface temperature at the head-down time, that is, at the time of either printing or correcting operations, in order that the control section 4*b* may give a suitable heat command, print command or correction command. Thus this invention is so designed that the printing and correcting operations can be consistently executed under optimum conditions. The arrangement is also such that when the thermal head 4 which executes the above described operation presses the platen 2, a stable predetermined amount of print energy can be consistently applied to the print ribbon 6, whereby excellent print and correction performances can be obtained as well as enabling the reduction of the time required for both operations to the shortest optimum extent.

In the above described preferred embodiment, description was made of an embodiment of the thermal printer having both print and correction functions equipped with the printing ribbon 6. However, the method of this invention is not limited to the above-mentioned embodiment. As another example, this invention may be embodied in a thermal printer which separately employs a printing ribbon and a correcting ribbon, wherein the former printing ribbon having a single print function does not have the overcoat layer 21 shown in the above FIG. 3 formed on it, while the latter correcting ribbon having a single correcting function has, for example, the overcoat layer 21 shown in FIG. 3, formed over its surface, and does not have the ink layer 22 shown in FIG. 3 formed on it. In this case as well, the manner in which the respective printing and correcting operations is carried out is similar to that of the above described preferred embodiment. The surface temperature of the thermal head 4 is elevated to a predetermined temperature such as about 280° C. in the case of the printing operation and in the case of the correcting operation to about 480° C., for example, whereby this embodiment is also capable of exhibiting excellent printing and correcting performance.

The printing method for the thermal printer of this invention arranged as described above is advantageous in that excellent printing and correcting performances can be obtained and furthermore the time required for the respective printing and correcting operations can be reduced to the shortest optimum extent.

What is claimed is:

1. A printing method for a thermal printer having a heat-sensitive recording medium containing a coloring material which is interposed between a recording paper being laid on a platen and a thermal head wherein printing is executed by transferring said coloring material from said heat-sensitive recording medium to said recording paper in accordance with the print energy of said thermal head;

low print energy and high print energy being set in advance;

said low print energy being applied to said heat-sensitive recording medium, during the printing, so as to execute the required printing on said recording paper;

said high print energy being applied to said heat-sensitive recording medium so as to bond the printing on said recording paper to said heat-sensitive recording medium during the correcting operation whereby printing recorded on said recording paper is corrected; and characterized by said thermal head being preheated for the preparation of said correct operation.

2. A printing method in a thermal printer according to claim 1, wherein the preheating of said thermal head is effected in the head-up state wherein said thermal head is separated from said platen.

3. A printing method in a thermal printer according to claim 1, wherein printing and correcting operations are executed when the surface temperature of said thermal head reaches a predetermined temperature.

* * * * *